Sept. 5, 1950 J. B. RETALLACK 2,520,962

SYSTEM FOR AUTOMATICALLY TICKETING TELEPHONE CALLS

Filed Oct. 14, 1948 6 Sheets-Sheet 1

INVENTOR
J. B. RETALLACK
BY P. C. Smith
ATTORNEY

INVENTOR
J. B. RETALLACK
BY P. C. Smith
ATTORNEY

Sept. 5, 1950 J. B. RETALLACK 2,520,962

SYSTEM FOR AUTOMATICALLY TICKETING TELEPHONE CALLS

Filed Oct. 14, 1948 6 Sheets-Sheet 3

INVENTOR
J. B. RETALLACK
BY P. C. Smith
ATTORNEY

Sept. 5, 1950 J. B. RETALLACK 2,520,962

SYSTEM FOR AUTOMATICALLY TICKETING TELEPHONE CALLS

Filed Oct. 14, 1948 6 Sheets-Sheet 4

INVENTOR
J. B. RETALLACK
BY P. C. Smith
ATTORNEY

Sept. 5, 1950 J. B. RETALLACK 2,520,962

SYSTEM FOR AUTOMATICALLY TICKETING TELEPHONE CALLS

Filed Oct. 14, 1948 6 Sheets-Sheet 5

INVENTOR
J. B. RETALLACK
BY P. C. Smith
ATTORNEY

SYSTEM FOR AUTOMATICALLY TICKETING TELEPHONE CALLS

Filed Oct. 14, 1948 6 Sheets-Sheet 6

INVENTOR
J. B. RETALLACK
BY P. C. Smith
ATTORNEY

Patented Sept. 5, 1950

2,520,962

UNITED STATES PATENT OFFICE 2,520,962

SYSTEM FOR AUTOMATICALLY TICKETING TELEPHONE CALLS

John B. Retallack, New York, N. Y., assignor to Bell Telephone Laboratories, Incorporated, New York, N. Y., a corporation of New York Application October 14, 1948, Serial No. 54,560

7 Claims. (Cl. 179—7)

This invention relates to automatic telephone systems in general and in particular to automatic systems wherein automatic toll ticketing is provided.

In a copending application of J. W. Gooderham, Serial No. 448,782, filed June 27, 1942, is disclosed and claimed an automatic telephone system wherein a ticketing trunk is selected and used to complete a call made by a calling subscriber to a called location which is in an area dictating that the calling subscriber be charged and ticketed for a toll call. In the above-mentioned application, the disclosure of which is, by example, of a step-by-step automatic system, the ticketing trunk has permanently associated therewith a ticket printer controlled by a printer control circuit, forming a part of the central office sender, to effect the printing of a toll ticket by a ticket printer.

In a copending application by J. B. Retallack, Serial No. 54,559, filed October 14, 1948, is disclosed a panel type automatic system wherein a ticketing trunk is used to complete a toll call. However, in that Retallack application a printer control circuit separate from the subscriber's sender is used to control the ticket printer and is one of a plurality of such circuits from which any idle one may be selected and used in connection with any ticketing trunk independently of the sender used. The present invention is similar to that set forth in the latter application except as specifically arranged for operation in a cross bar system.

The main object of the present invention is to improve automatic ticketing arrangements in general and in particular to provide more flexibility and economy in the use of printer control circuits.

It is a further object of the present invention to provide a plurality of printer control circuits common to a group of ticketing trunks whereby any such control circuit may be associated with any trunk for ticket printer control purposes to thus reduce the number of such control circuits required to serve said group of trunks.

In accordance with the present invention a cross bar system is arranged in which a plurality of printer control circuits is provided, an idle one of which circuits is associable over cross bar switches with the subscriber's sender and with the ticketing trunk seized under control of a marker in accordance with digits of the called subscriber's number registered in the sender. The marker causes the operation of select magnets of said switches in accordance with the sender and trunk used for the connection and causes the operation of hold magnets of said switches in accordance with the idle control circuit selected for use. Control leads are extended under control of said switches from the sender to the control circuit over which the called number registrations are transferred from the sender registers to the control circuit registers. Other control leads are extended from the control circuit to the ticket printer of the trunk over which the printer is controlled from the control circuit registers. The invention, as disclosed herein, further provides for association of an idle line identifier with the calling subscriber's station and with the selected control circuit whereby, after having registered the calling line identification, said identifier can transfer said registration to registering means in said control circuit from which means said information is subsequently transferred to the ticket printer of the trunk under control of said printer control circuit.

The invention, briefly outlined above, is described in detail hereinafter as embodied in a skeletonized cross bar system as shown on the drawings forming a part of the disclosure, which drawings are described generally as follows:

Fig. 1 is a conventional representation of cross bar switch connections from a subscriber's appearance on the line link frames to trunk appearances on the office frames through district junctors and district frames, a sender link by means of which a subscriber's line may become associated with an idle sender through the medium of the district junctor, and district and office frame connectors by means of which the marker effects the selection of switching paths in, through, and between said frames;

Only sufficient disclosure is described hereinafter as is sufficient to make understandable to one skilled in the pertinent art the construction, operation and merit of the present invention. Reference is made to the above Retallack application filed the same day as this application and to the Gooderham application for more detailed description of the type of system shown in brief herein and described in connection with the present invention.

*Initiation of a call*

Figure 3:
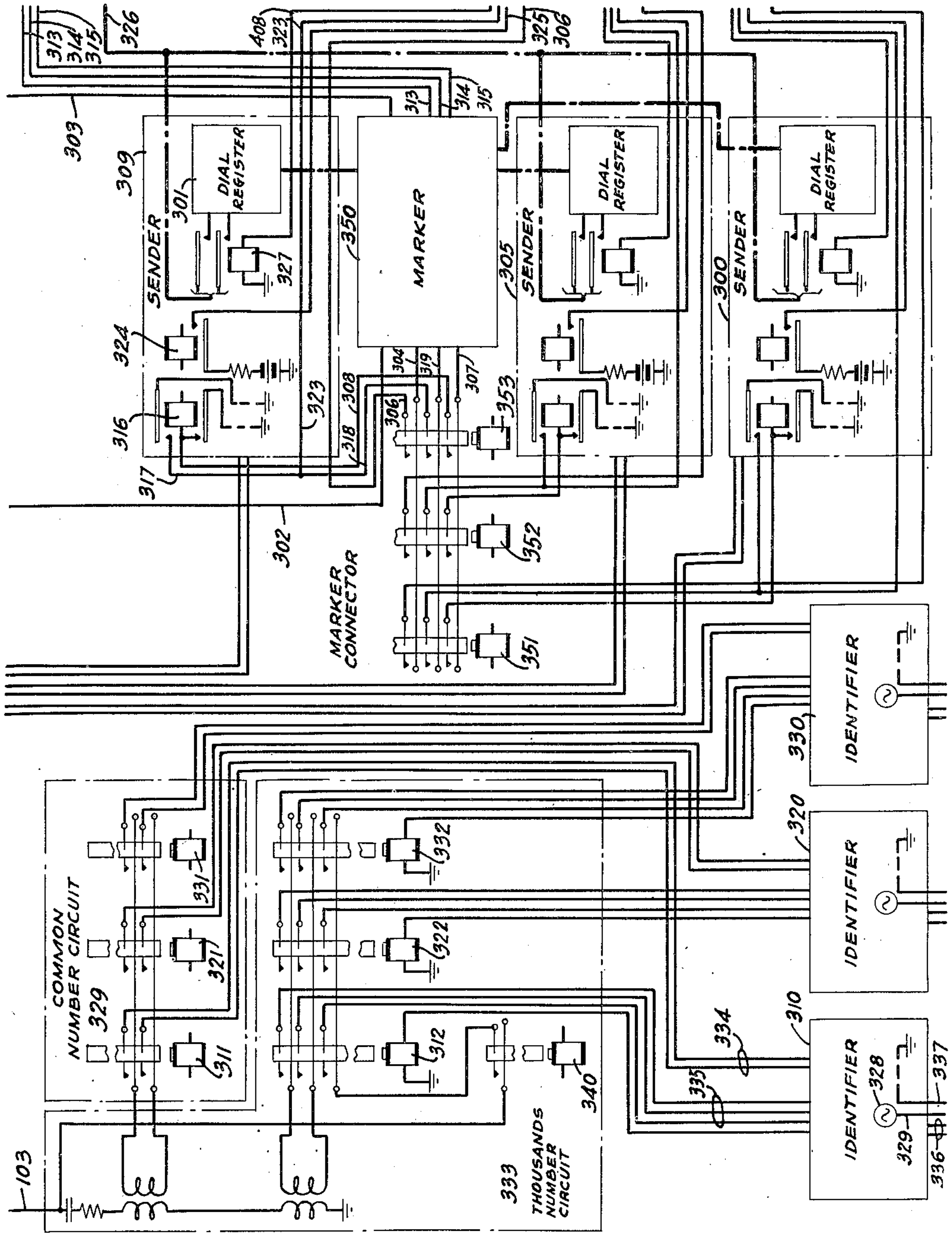
Fig. 3 shows a group of subscribers' senders, to any one of which a calling subscriber's line may have access, a marker associable with any sender to effect control functions in accordance with the called number and with the sender used, and three identifiers representative of a group of same with their common calling line identifying circuits.
Figure 4:
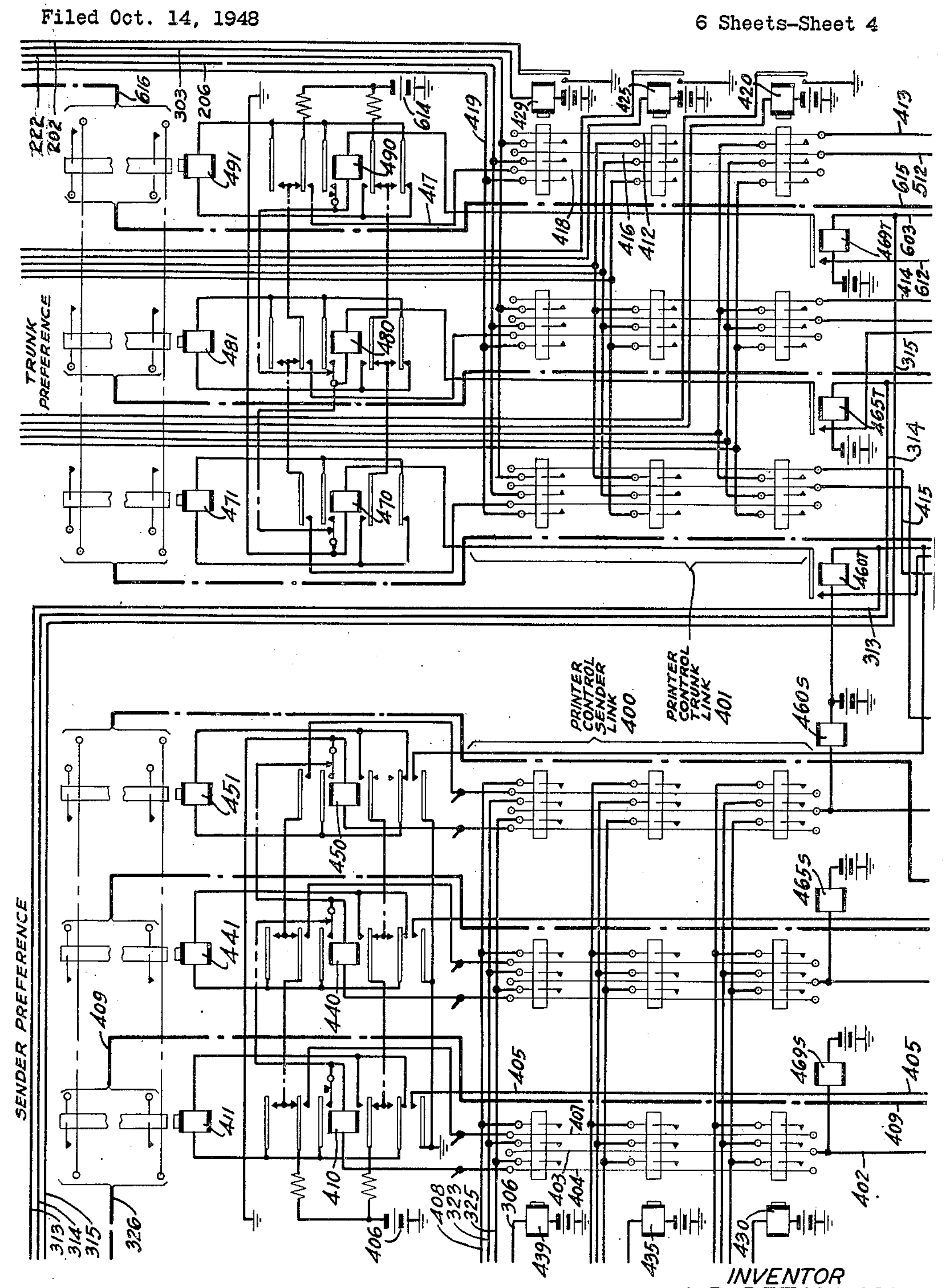
Fig. 4 shows two cross bar switches, one having horizontal appearances terminating in senders, the other having horizontal appearances terminating in trunks and both having a hold magnet of each common to one of a plurality of printer control circuits, each of which control circuits appears on a vertical of each switch so as to be connectable between any selected sender and any selected trunk.
Figure 5:
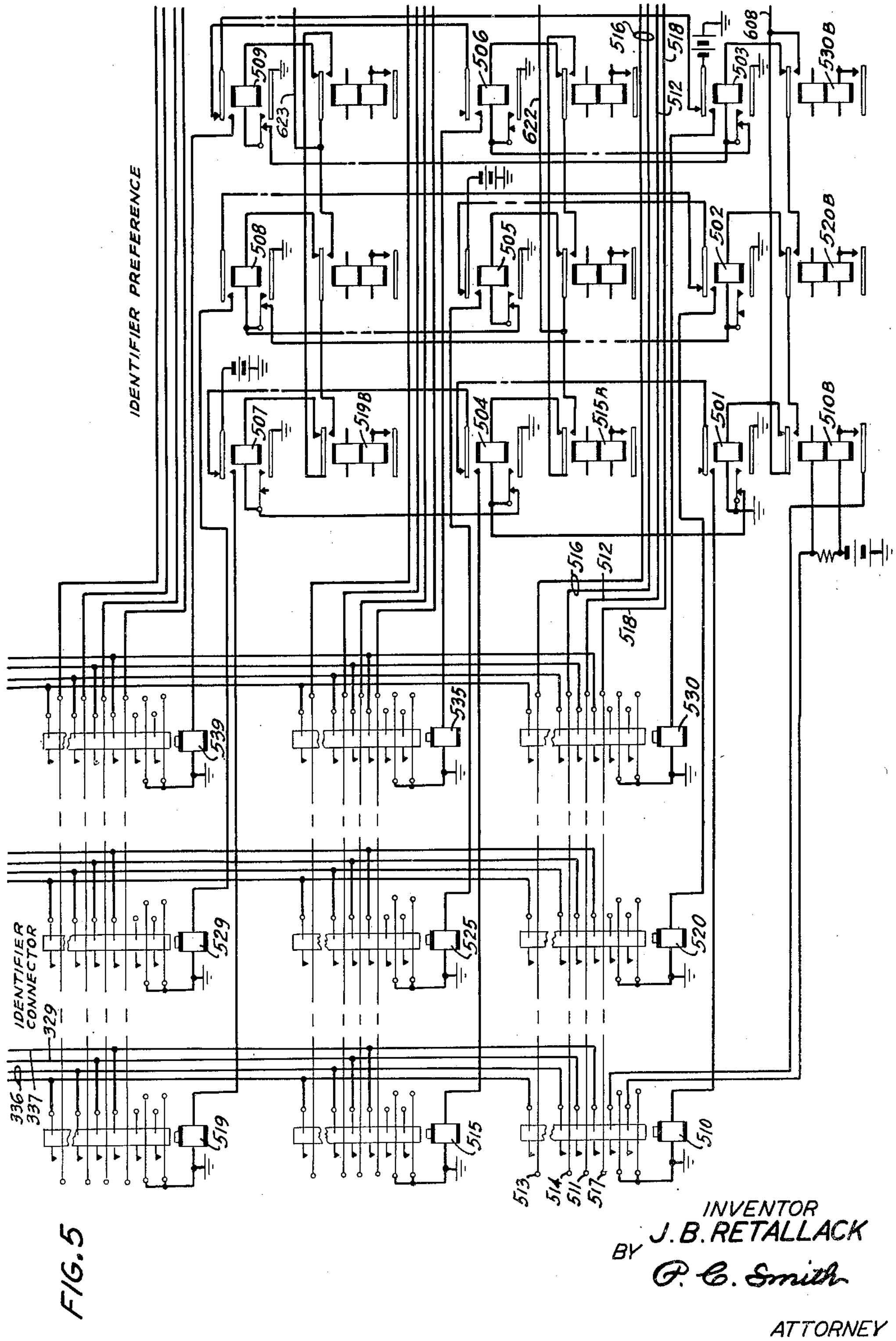
Fig. 5 shows a group of identifier connectors and identifier preference relay chains for enabling any trunk to call in an idle identifier to be associated with any printer control circuit.
Figure 6:
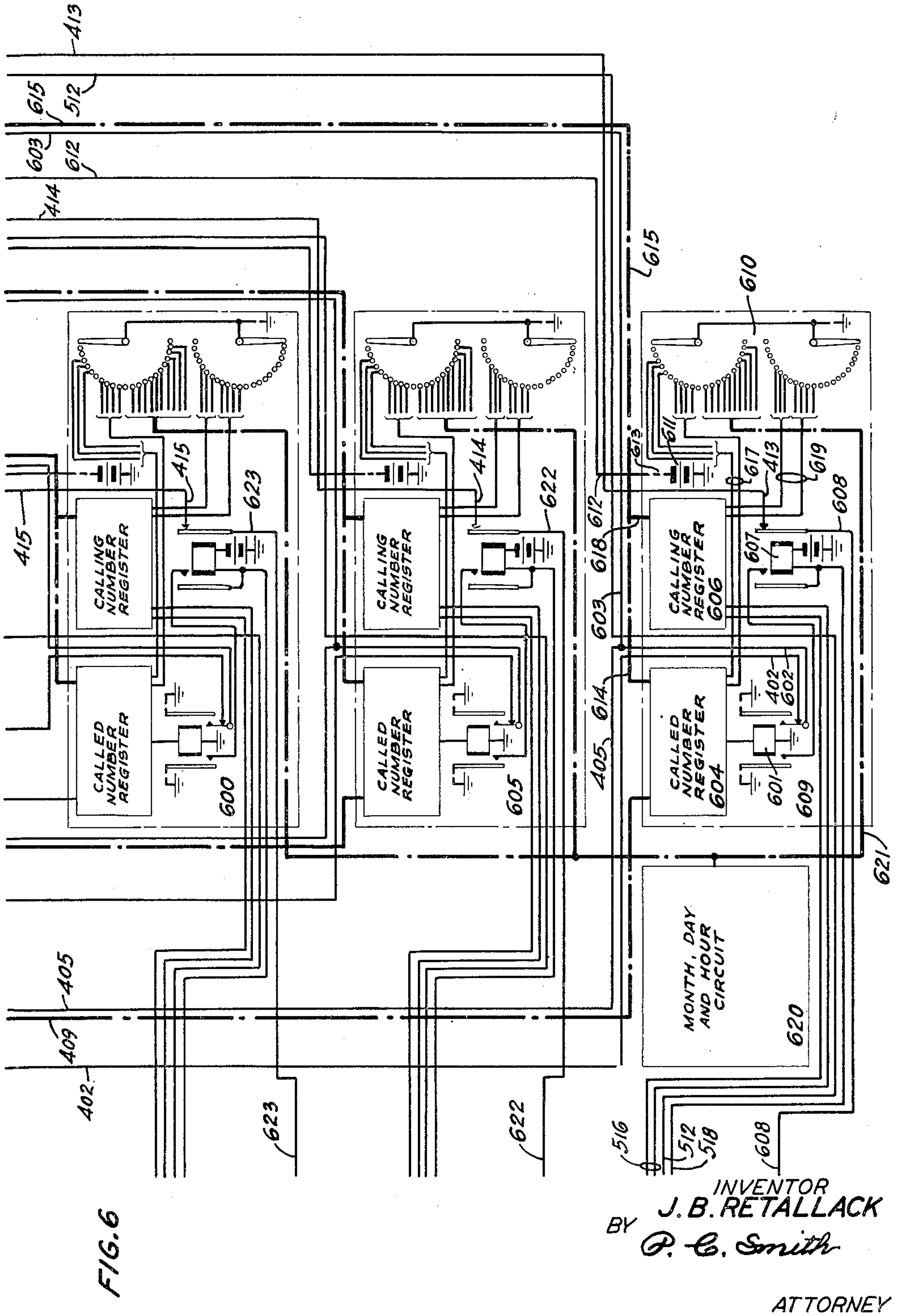
Fig. 6 shows three printer control circuits, representative of a plurality of same, terminating in verticals of the sender-control link switch and of the trunk-control link switch of Fig. 4.

When subscriber 100 initiates a call on his line his station apparatus is associated with an idle subscriber's sender, such as 309 of Fig. 3, in the usual manner by means of line link frame 101, district junctor 120 and sender link 130. Any subscriber, such as 100, may be connected with any idle sender such as 300, 305, or 309 of Fig. 3, that group of senders representing the usual group of subscribers' senders available for use by a particular subscriber.

Upon being connected, as above, with an idle sender, such as 309, subscriber 100 receives dial tone and proceeds to dial the called number into the dial register 301 of sender 309. The called number consists generally of a called office code and called station numerical digits.

A marker 350, which, of course, may be one of a plurality (not shown) of such common control devices, as is well known, is associable with any sender requiring the usual and well-known services of such common control equipment as a marker. Marker 350 is associated with sender 309 by means of the relay 353 of a marker connector corresponding to sender 309. Connector relay 353 is operated by sender 309 at such time as sufficient digits of the called number have been registered in dial register 301 to provide marker 350 with information for a function to be performed. Marker 350 takes notice of the called office digits registered in dial register 301 and, having determined that a connection is required to a ticketing trunk in order to properly charge for a toll call to that called office, proceeds to select an idle ticketing trunk, to operate select magnets corresponding to sender 309 and to the selected trunk on the printer control sender and trunk link cross bar switches 400 and 401 and to test for and select an idle printer control circuit by operating two hold magnets on said link switches 400 and 401. The latter operations are necessary to connect the sender 309 and the selected trunk to the selected idle printer control circuit which controls the ticket printer in the selected trunk.

*Operation of sender and trunk select magnets on link*

Figure 2:
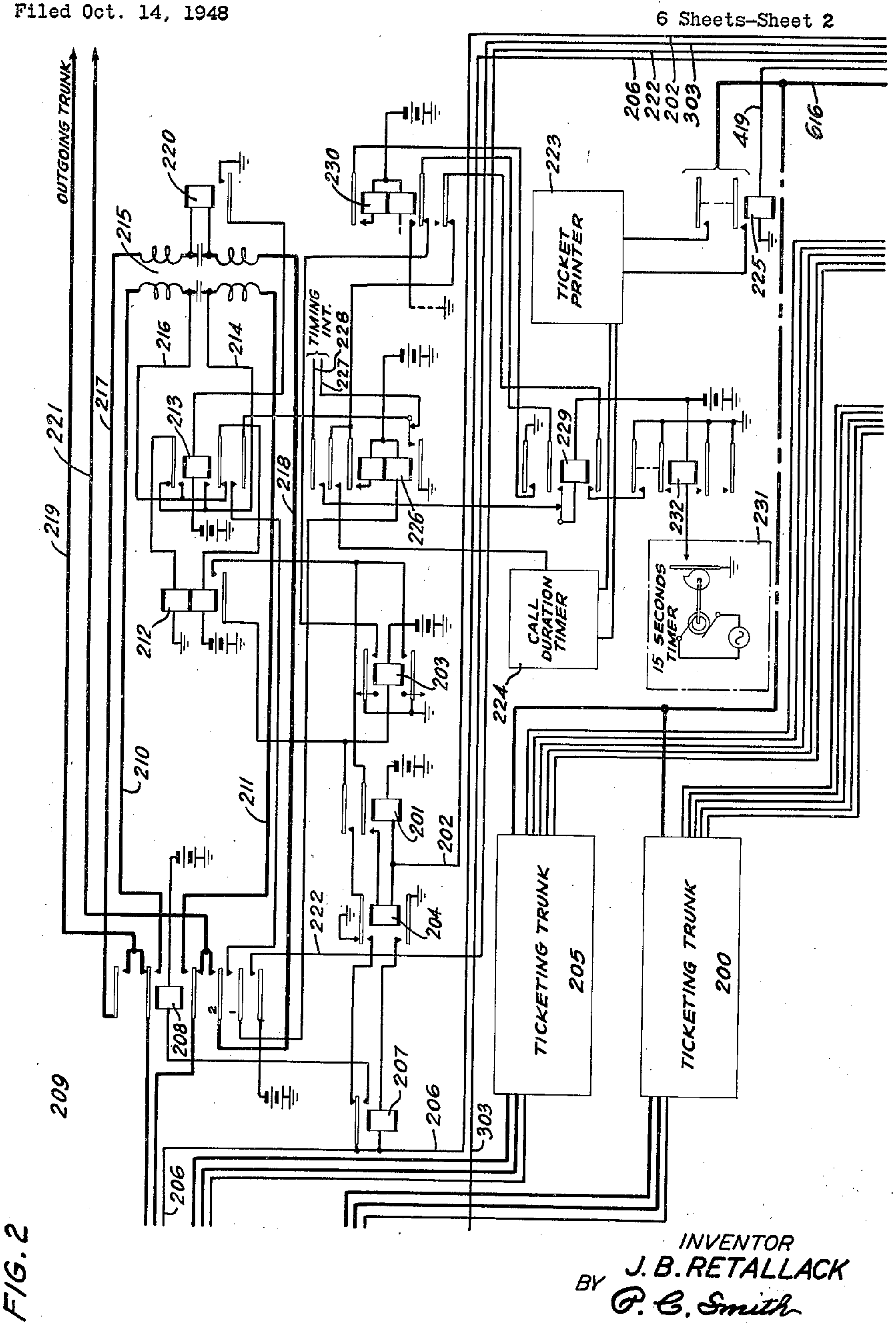
Fig. 2 shows three trunks representative of a group of trunks, any one of which may be selected, one trunk having been shown in some detail but only to the extent necessary to a full understanding of the present invention, and a ticket printer associated with the detailed trunk.

Marker 350, by means of various leads, as is well known, such as 302 and 303, and by means of the district frame connector 140 and office frame connector 150, selects an idle channel to an idle ticketing trunk such as trunk 209 of Fig. 2. Trunks 200, 205 and 209, of course, represent a group of ticketing trunks, any idle one of which group may be selected for any particular call requiring such a trunk. Marker 350 operates select magnet 102 of office frame 170 to select idle trunk 209 as means for ticketing the call. Over lead 303, which may be multipled with the operating lead of select magnet 102, marker 350 applies ground to operate select magnet 429 corresponding to trunk 209 of printer control trunk link cross bar switch 401. At approximately the same time marker 350 applies ground to lead 304, over the upper operated contacts of marker connector relay 353, lead 306 to battery and ground through the winding of select magnet 439 corresponding to sender 309 on the printer control sender link cross bar switch 400. Select magnet 439 is operated over this circuit.

Although only three senders are shown as representing ten such equipments it will be understood that more than one sender-printer control link switch can be provided to accommodate more than ten sender terminations. For instance, if one hundred senders are to be employed, ten such switches will be necessary. The marker, after having identified the sender number, say some one of a hundred numbers from 00 to 99, will have identified the proper sender link switch to be employed and will therefore be in proper condition to energize one of a possible hundred sender select magnets and one of a possible hundred hold magnets. Of the hundred hold magnets, it will be understood that ten groups of ten each such magnets will be exclusive respectively to ten printer control circuits each of which is represented by a hold magnet on each of the ten possible sender link switches. Of course, the number of senders, trunks and control circuits are not limited to the above proportions or to the proportions illustrated on the drawings as representative of one embodiment of the invention.

*Operation of hold magnets for selection of printer control link*

Marker 350, by means of leads 313, 314 and 315, tests the operating or holding circuits of hold magnets 460T, 465T and 469T of the printer control links to determine which, if any, is idle. A ground condition on any of these hold magnets represents a busy condition. It will be assumed that printer control circuit 609 is idle and is selected by the marker 350 applying ground to lead 315. The selection of a particular control circuit of a number of possible idle ones may be accomplished by means of an allotter or preference arrangement in order to more equitably distribute the load over the various control circuits. Such an arrangement is not shown but is a known expedient. Hold magnet 469S of the sender link is operated over a circuit from battery and ground through the winding of hold magnet 469S, lead 402, normal contacts of the release relay 601 of control circuit 609, lead 602, lead 603 to ground in marker 350 over lead 315. Similarly, hold magnet 469T of the trunk link is operated over an obvious circuit to ground on lead 315.

*Marker channel test and release*

Marker 350 checks the channel selected from the district junctor 120 to selected ticketing trunk 209 and checks the channel established from sender 309 to trunk 209 via printer control circuit 609. Being satisfied that these channels are properly established the marker 350 operates the hold magnets of the district and office frames, such as 104 of office frame 170 and then applies ground to lead 307, over the lower operated contacts of marker connector 353 relay, lead 308 to the winding of marker release relay 316 in sender 309. Relay 316 operates due to this potential, locking over its lower front contact to ground and applying ground to lead 317 over its upper front contact, and to marker 350 over lead 318, middle operated contacts of marker connector 353 relay and lead 319. Ground on lead 319 signals marker 350 to release which it does in turn releasing connector relay 353. The hold magnets of the frames are held by sleeve ground from the district junctor until cut-through of the district. The hold magnets 469S and 469T of the printer control link are held operated by ground over the upper front contacts of relay 316 and leads 317 and 323 of sender 309, over vertical 403 of sender link 400 to lead 402.

When select magnet 429 of the trunk link 401 was operated, an operating circuit was completed for relay 201 of the trunk 209 which circuit may be traced from battery and ground, through the winding of relay 201, over lead 202 to ground over the right front contact of select magnet 429. Relay 201 operates over this circuit. Relay 201 in operating completes an operating circuit for slow releasing relay 203 from ground over upper back contact of relay 204, upper outer front contact of relay 201, to battery and ground through the winding of relay 203. Relay 203 operates over this circuit. Relay 203 in operating prepares an operating circuit for relay 204 at the lower outer front contact of relay 203, over the upper inner front contact of relay 201 and through the winding of relay 204. Relay 204 does not operate however until select magnet 429 is released to remove the shunting ground from the other side of relay 204. When, however, marker 350 released, ground was removed from lead 303 to thereby release select magnet 429. Select magnet 429 in releasing removes the ground from lead 202 and permits relay 204 to operate in series with relay 201. Relay 204, in operating, switches, at its upper armature, the operating ground for relay 203 from ground at the upper back contact of relay 204 to the grounded sleeve conductor 206 of the trunk over the upper back contact of relay 207. Relay 207 does not operate because it is shunted by ground on one side from sleeve 206 and on the other side from lower front contact of relay 204.

When the district junctor is cut through, at such time as sender 309 has completed its selections over the outgoing trunk lines over the upper and lower inner back contact of relay 208 of the trunk, ground will be removed from sleeve conductor 206 to permit sleeve relay 207 to operate in series with the parallel hold magnet circuits of the frames.

The release of marker 350, of course, also releases select magnet 102 of the office frame 170 and releases select magnet 439 of the sender link by removing ground from conductors 306 and 304.

*Registering the called number*

When all of the called number digits, both office code and numericals, have been registered in dial register 301, the dialing complete relay 324 of the sender is operated. Relay 324 in operating completes an operating path for a sender preference relay from battery and ground over the front contact of relay 324, conductor 325, vertical 404 of sender link switch 400, winding of sender preference relay 410, normal contacts of the other preference relays in the chain, such as relays 440 and 450, to ground. Relay 410 operates over the latter circuit and, in so operating, accomplishes at least three functions of interest at present. Over its lowermost front contact it connects ground to lead 405 to hold the hold magnets 469T and 469S of the printer control link over leads 603 and 402, respectively. Relay 410, in operating, completes an operating circuit for sender connector relay 411 from ground and battery 406, over the lower inner front contact of relay 410, through the winding of connector relay 411 and to ground over the upper inner front contact of relay 410 and normal contacts of all other preference relays in the chain, such as 440 and 450. Sender connector relay 411 operates in the latter circuit thereby extending sufficient conductors, represented by cable 326, from sender 309 to printer control circuit 609 whereby the called number registered in dial register 301 may be transmitted to the called number register 604 of the control circuit 609. Relay 327 of sender 309 is operated over a circuit extending from ground and battery 406, over the upper middle front contact of relay 410, vertical 407 of the sender link switch 400, conductor 408 and to ground through the winding of relay 327 which operates to connect cable 326 to the various register relays of the dial register 301 of sender 309. The sender 309 then proceeds in well-known fashion to transfer the called number registrations to the called number register 604 of control circuit 609 over front contacts of relay 327, cable 326, front contacts of connector relay 411, cable 409 to register 604. Prior to this, the exact time not being of particular importance here, relay 316 of sender 309 was released removing ground from lead 323, vertical 403 of sender link switch 400 and from the hold magnets 469S and 469T. These hold magnets are held operated, however, as has been described, from ground over the lower outer front contact of preference relay 410.

When all of the called number digits have been transferred to the register 604 from the sender register 301 the sender release relay 601 is operated. Relay 601, in operating, opens at its normal contacts the connection between conductors 402 and 602 and places ground on conductor 602 over its right front contact. When the connection between conductors 402 and 602 was broken the ground previously supplied to conductor 402 over conductors 602 and 405 from the lower outer front contact of preference relay 410 for holding hold magnet 469S operated is removed and hold magnet 469S releases. With the release of hold magnet 469S the preference relay 410, connector relay 411 and relays 327 and 324 of sender 309 are released. In fact the sender 309 with all of its connections is released for use by other subscribers. Hold magnet 409T is held operated by ground applied thereto over conductors 603 and 602 from the front contacts of relay 601.

*Cut-through of district junctor and trunk*

Prior to the sender release, as above described, sender 309 sends the district junctor 120 to "cut-through" condition wherein ground is removed from the sleeve conductor 206 of trunk 209. Removal of ground from sleeve lead 206 permits sleeve relay 207 to operate in series with the hold magnets of the frames to ground over the lower front contact of relay 204. Removal of ground from sleeve lead 206 and the operation of sleeve relay 207 removes the ground from the operating circuit of slow releasing relay 203. However, relay 203 does not release immediately and, as will be understood, a new holding ground is provided to prevent such release. Cut-through relay 208 operates from sleeve ground over the front contact of sleeve relay 207. The operation of cut-through relay 208 extends the tip and ring conductors of subscriber 100 to conductors 210 and 211, respectively, over upper and lower inner front contacts of relay 208. Supervisory relay 212 operates in a circuit extending from ground, through the upper winding of relay 212, upper back contact of reversing relay 213, conductor 214, lower left part of repeat coil 215, conductor 211, lower inner front contact of relay 208, over the tip-ring loop of subscriber 100, upper inner front contact of relay 208, conductor 210, upper left part of repeat coil 215, conductor 216, lower inner back contact of relay 213, to battery and ground through the lower winding of relay 212. Relay 212, in operating, provides a holding path for relay 203 from ground over the lower front contact of relay 203, front contact of relay 212 to battery and ground through the winding of relay 203.

The operation of relay 208 also extends the upper right and lower right parts of repeat coil 215 to the outgoing trunk over conductors 217 and 218, respectively, in a circuit extending from conductor 219 of the outgoing trunk, over the upper outer front contact of relay 208, conductor 217, upper right part of repeat coil 215, the winding of supervisory relay 220, lower right part of repeat coil 215, conductor 218, lower No. 2 armature and front contact of relay 208 to conductor 221 of the outgoing trunk. The polarity of voltage on the outgoing trunk loop is opposed to that required to operate polar supervisory relay 220. When the called subscriber answers, however, as will be explained later, the polarity of said loop voltage is reversed, as is well known, to operate relay 220.

*Identification of calling line number and its registration*

There is a group of identifier preference and busy relays for each printer control circuit; preference relays 501, 502 and 503 and busy relays 510B, 520B and 530B for lead 608 from control circuit 609; preference relays 504, 505 and 506 and busy relays 515B, etc. for lead 622 from control circuit 605; and preference relays 507, 508 and 509 and busy relays 519B, etc. for lead 623 from control circuit 600.

In Fig. 3 are shown three identifiers 310, 320 and 330 representing a group of such apparatus. Identifier connector relays 510, 515 and 519 are associated with identifier 310 and can connect said identifier to any control circuit. Likewise, connector relays 520, 525 and 529 are associated with identifier 320. Identifier 330 has its set of connector relays as well, three such groups of connector relays being representative of any desired number of same. Each horizontal row of connector relays, such as 510, 520 and 530 is associated with a particular printer control circuit, such as 609, the latter capable of being associated with any one of the identifiers 310, 320 or 330 at one time.

When relay 208 operated to cut through the trunk, battery was applied to conductor 222 over the lower outer front contact of relay 208, over vertical 412 of the trunk link switch 401, conductor 413, back contact of relay 607, conductor 608, upper back contact of identifier busy relay 510B and to ground through the winding of identifier preference relay 501. Relay 501 operates in this circuit provided busy relay 510B is not operated. Whenever an identifier, say 310, is busy each of its busy relays such as 510B, 515B and 519B will be operated except that one on the horizontal level corresponding to the control circuit used for selecting such identifier. Therefore, if relay 510B is not operated, when leads 413 and 608 become energized by operation of relay 208, this means that identifier 310 is idle and since it is first preference for lead 608, as wired, it will be selected as described hereinafter. Relay 501 locks to ground over its lower front contact and at its normal contacts opens the operating circuits of relays 504, 507, etc. so that these preference relays cannot be operated while relay 501 is operated. Relay 501 in operating completes over its upper front contact an operating path for connector relay 510 as follows, ground, the winding of connector relay 510, upper front contact of relay 501, upper back contacts of all other preference relays corresponding to identifier 310, such as 504 and 507, to battery and ground. Connector relay 510 operates in this circuit thereby extending control leads from identifier 310 to printer control circuit 609 and to trunk 209 over the trunk link switch 401.

The tone signal source 328 of identifier 310 is applied to lead 329 to identify the calling line number in the usual manner. The tone source 328 is extended over lead 329, horizontal 511 of connector relay 510, through operated contacts of connector relay 510, over lead 512, vertical 416 of trunk link switch 401, to sleeve lead 206 of trunk 209, over the sleeve leads of the frame switches to the sleeve lead 103 of subscriber line 100, to the common number circuit 329 and to the thousands number circuit 333, etc., of the identifying circuits common to all identifiers. Relay 340 and connector relays 311 and 312 of the number circuits are operated in the usual sequence to identify the calling line number and record same in registers of identifier 310 over groups of leads such as 334 and 335 in the manner fully described in the application of J. W. Gooderham hereinbefore referred to.

When the calling number has been identified and registered in identifier 310, it is transferred to the calling number register 606 of printer control circuit 609. Such information is transmitted over a group of leads represented by 336 from identifier 310, over horizontals 513 and 514 and operated contacts of identifier connector relay 510, over a group of leads 516 to the calling number register 606 of printer control circuit 609. The transmission of this information is followed by a check signal sent to the control circuit 609 from the identifier 310 to the effect that the identifier has transmitted the desired information and the latter has been registered in calling line register 606. This signal comprises the operation of relay 607 over a circuit from ground in identifier 310, over lead 337, horizontal 517 and operated contacts of connector relay 510, lead 518 to battery and ground through winding of relay 607. Relay 607 operates as a signal to the control circuit 609 that it may proceed to release the identifier. Relay 607 locks operated over its left armature and front contact to ground over the left armature and front contact of relay 601. When the control circuit 609 has received all of the necessary information from the identifier 310 such as the above-described calling line number and other information such as perhaps class of service, identifier number, charge rate, etc., and relay 607 has operated and locked, the identifier start lead 608 is opened at the back contact of relay 607 to release preference relay 501, identifier connector relay 510 and common and thousands number circuit relay 340 and connector relays 311 and 312 by virtue of identifier 310 being released to normal. Release of identifier 310 does not release relay 607 of control circuit 609, since relay 607 is locked operated under control of relay 601.

*Résumé*

The printer control circuit 609, at this time, has recorded therein all the information desired to be recorded on a toll ticket except for the month, day and hour of the call and the elapsed time of the ticketed conversation. The marker, sender and identifier have completed their functions and the printer control circuit 609 is connected to the trunk 209 by means of trunk link switch 401. The printer control circuit 609 is now ready to transmit its registered information to the ticket printer 223 of trunk 209 for starting the printing of the toll ticket for the call effected by subscriber 100. The printer control circuit 609 will transmit the calling number and the called number, among other desired items of information with which it may have been provided, and calls in a month, day and hour circuit 620 for transmitting to the ticket printer 223 such time information.

A printer control progress switch 610 controls (as fully disclosed by Gooderham above), step-by-step, the transmission of such information to the ticket printer 223, at the conclusion of which transmissions relay 601 of the printer control circuit is released to release relay 607 and the printer control trunk link 401 with all associated apparatus, leaving the trunk 209 to record the elapsed time of conversation in call duration timer 224 and to cause such elapsed time to be printed on the ticket by the ticket printer 223 at the conclusion of the conversation.

*Printing the called and calling numbers and month, day and hour*

When printer control circuit 609 is ready to initiate printing of the toll ticket, battery 611 is connected to lead 612 at 613, over the front contact of operated hold magnet 469T of the trunk link switch 401, winding of trunk preference relay 490 to ground over normal contacts of other trunk preference relays such as 480 and 470. Relay 490 operates in this circuit and in operating accomplishes at least two functions. It operates trunk connector relay 491 over a circuit from battery 614, the lower inner front contact of relay 490, the winding of connector relay 491 and to ground over the upper inner front contact of relay 490 and normal contacts of other trunk preference relays. It also operates relay 225 in a circuit from battery 614, over the upper middle front contact of relay 490, lead 417, vertical 418 and operated contacts of trunk link switch 401, lead 419, to ground through winding of relay 225.

The called number is transmitted to ticket printer 223 from the called number register 604 of the control circuit 609 over groups 614 and 615 of leads, operated contacts of trunk connector relay 491, group 616 of leads, front contacts of relay 225 to ticket printer 223. The called number is transmitted over the above path under control of progress switch 610 by means of group 617 of leads extending to said switch 610 from register 604.

The calling number is transmitted to ticket printer 223 from the calling number register 606 of control circuit 609 over groups 618 and 615 of leads, operated contacts of trunk connector relay 491, group 616 of leads, front contacts of relay 225 to ticket printer 223. The calling number is transmitted over the above path under control of progress switch 610 by means of group 619 of leads extending to said switch 610 from register 606.

The month, day and hour circuit 620 is associated with printer control circuit 609 and its progress switch 610 by means of control leads 621 and the progress switch 610 effects the transmission of the month, the day and the hour of the call to the ticket printer 223 over connector leads (not shown) similar to those from registers 604 and 606 of the control circuit 609.

The ticket printer 223 prints all of the foregoing information on the toll ticket as it is transmitted thereto and at the completion of all such transmission relay 601 of printer control circuit 609 is released. Release of relay 601 removes ground at its right front contact from leads 602 and 603 thus permitting hold magnet 469T to release. Release of relay 601 also opens at its left front contact the holding circuit of relay 607 which thereupon releases. Hold magnet 469T, in releasing, returns printer control circuit 609 to normal along with the month, day and hour circuit 620, releases trunk preference relay 490 and trunk connector relay 491 to completely restore the trunk link to normal and releases relay 225 to disconnect the ticket printer 223 from the group 616 of leads from the trunk connector relays.

*Résumé*

The trunk 209 is the only major piece of apparatus remaining connected to the subscriber 100 and the ticket printer has printed all of the necessary information of the toll ticket except the duration of the call. The latter information is provided at the conclusion of the call under control of trunk 209 as will be described hereinafter.

*Answer by called party*

When the called subscriber answers by lifting his receiver from its normal position he effects a reversal of polarity of voltage over the outgoing trunk loop to thereby operate polar relay 220 over a circuit including the upper and lower righthand portions of repeat coil 215, as previously traced. Relay 220, in operating, completes at its front contact an operating circuit for relay 213 from ground, over the front contact of relay 220, the winding of relay 213 to battery and ground. Relay 213, in operating, over this circuit, reverses the leads 214 and 216 connected to the two windings of supervisory relay 212 which continues to remain operated under the control of the calling subscriber. Relay 213, in operating, completes a circuit for operating relay 226 from battery, through the lower winding of relay 226, lower No. 1 armature and front contact of relay 208, the lower outer front contact of relay 213, normal contacts of relay 226 to ground supplied to lead 227 from the timing interrupter of the miscellaneous interrupter frame. Relay 226, in operating, locks to ground over its lower front contact, said ground replacing the ground on lead 227 removed therefrom when the normal contacts of relay 226 opened. After a measured time interval, such as two seconds, after the operation of relay 226, the interrupter frame supplies ground to lead 228, over the upper outer front contact of relay 226, normal contacts of the charging relay 229, through the winding of relay 229 to battery and ground. Relay 229 operates over the latter circuit and locks in a circuit from battery and the winding of relay 229, over the upper inner front contact of relay 229, the lower inner back contact of no-ticketing relay 230, to ground over the upper front contact of relay 203.

As soon as relay 229 operates and as soon thereafter as the timer 231 applies ground to the winding of the timer relay 232 a circuit is completed every 15 seconds at the upper outer front contact of relay 232. The latter circuit extends from ground, over the upper outer front contact of relay 232, the lower front contact of relay 229, the lower outer back contact of relay 230, to the upper inner and middle armatures of relay 226, thence over the upper inner front contact of relay 226 and through the upper winding of relay 226 to battery and ground to insure its remaining locked, and over the upper middle front contact of relay 226 to call duration timer 224. Thus, every 15 seconds call duration timer 224 receives a ground signal from timer 231 to record in the timer 224 the duration of the conversation to the closest full 15 seconds of conversation time.

*Calling subscriber hangs up first*

If, at the completion of the conversation, the calling subscriber 100 hangs up first, the operating circuit of supervisory relay 212 is opened by break in the tip-ring loop of the subscriber's line. Relay 212 releases and in doing so opens at its front contact the holding circuit of relay 203. Release of relay 203 opens at its upper front contact the holding circuit for the charge relay 229 and at its lower front contact opens the holding circuit for relays 204 and 201. Relays 229, 204 and 201 release. Relay 204, in releasing, removes ground at its lower front contact from the operating circuit of the sleeve relay 207 and all hold magnets of the frame switches of Fig. 1. Relay 207 and the frame links release to normal. Relay 207, in releasing, opens at its front contact the operating path of relay 208 which releases thus opening at its lower No. 1 armature and front contact the operating and holding circuit for relay 226. Relay 226, in releasing, opens at its upper outer front contact the operating path for relay 229 which remains released.

The release of relays 229 and/or 226 stops the accumulation of elapsed time registration in call duration timer 224, which then becomes associated with ticket printer 223 to cause the latter to print the total elapsed time of conversation on the toll ticket to complete the toll ticketing operation.

When the called subscriber hangs up his receiver the supervisory relay 220 will release, opening the operating circuit of relay 213 which releases to complete the return of trunk 209 to normal.

*Called subscriber hangs up first*

If the called subscriber hangs up first his supervisory relay 220 will release due to a reversal of polarity of the loop voltage on the outgoing trunk. The release of relay 220 opens at its front contact the operating path of relay 213 which then releases, in turn opening at its lower outer front contact the operating and holding path for relay 226. Relay 226 releases to open at its upper middle front contact the timing impulse circuit to the call duration timer 224 to thereby stop the recording of elapsed conversation time.

Figures 1, 7:
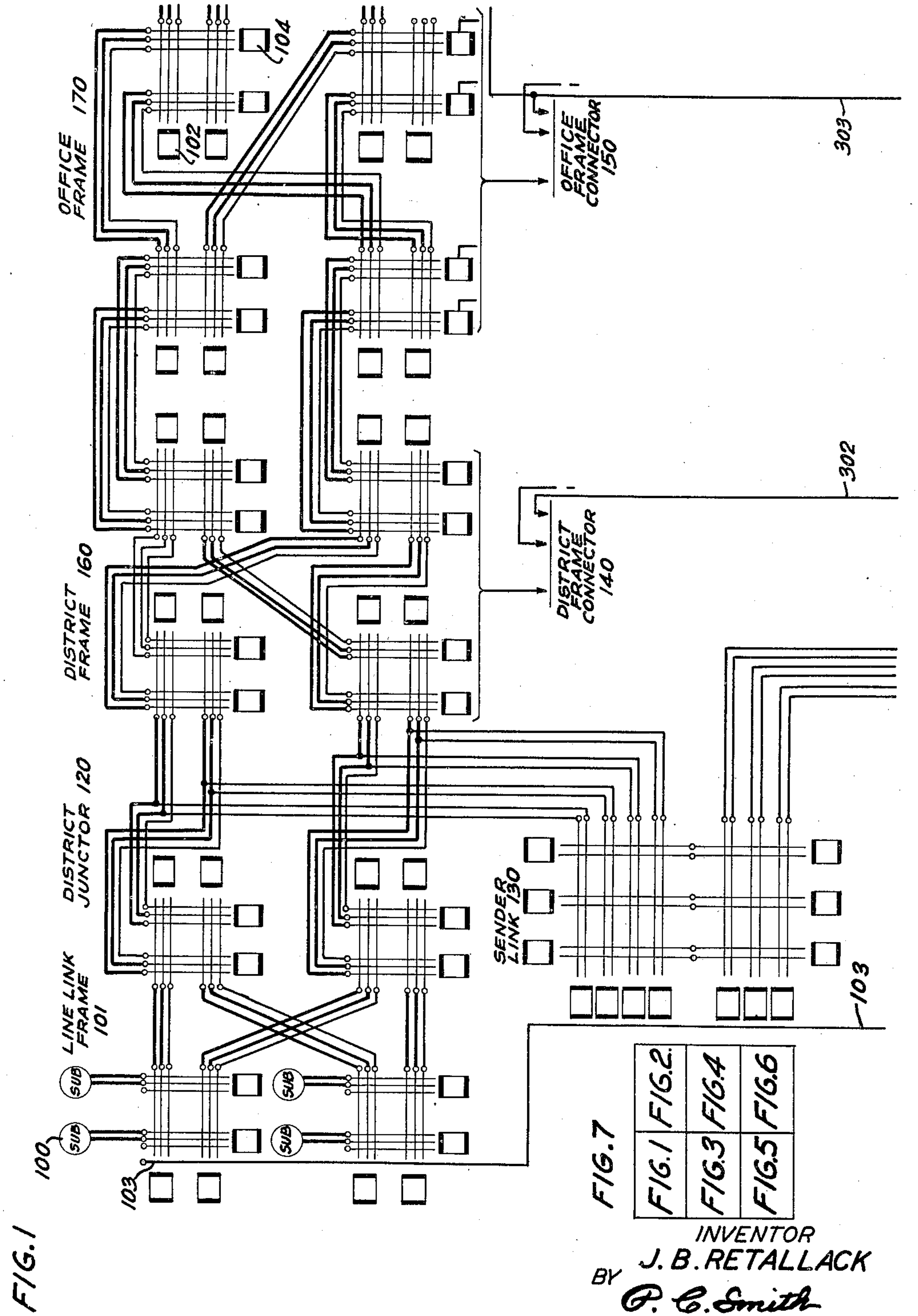
Fig. 7 illustrates the manner in which Figs. 1 through 6 may be arranged to show as a composite schematic a skeletonized cross bar automatic toll ticketing system embodying the present invention.

The remaining apparatus in trunk 209 and in Fig. 1 releases to normal as soon as the calling subscriber 100 hangs up his receiver and as soon as the elapsed time has been printed on the ticket, as was described above.

*Non-ticketed calls*

If, for any reason, such as a calling subscriber class of service for which no toll ticket is needed on an outgoing trunk call, no ticket is to be printed, relay 230 of trunk 209 will be operated as an incident to identification of the calling line number, class of service, etc. When relay 230 is operated the path from timer 231 to call duration timer 224 is opened at the lower outer back contact of relay 230 so that zero elapsed time will be recorded for billing purposes. Actually, in such a case, it probably would be more economical from an equipment use standpoint to take cognizance of the no-ticketing situation early enough to eliminate unnecessary operation by an identifier and by printer control links. However, upon properly ticketed calls, these apparatus are necessary as has been described previously. Relay 230, in operating, locks through its upper winding, over its upper front contact, to ground over the upper outer front contact of charge relay 229. Relay 230, in operating, also transfers the locking circuit of relay 229 to ground over the lower inner front contact of relay 230.

What is claimed is:

1. In an automatic ticketing system, a calling line, a plurality of trunks each having a ticket printer associated therewith, switching apparatus, a plurality of senders, means for associating an idle one of said senders with said calling line upon the initiation of a call on said line, means in said sender for registering the office code and numerical digits of a wanted line number, a plurality of markers, means for associating an idle marker with a seized sender, means controlled by said marker in accordance with the registered office code digits for controlling said switching apparatus for extending a connection from said line to an idle one of said trunks, a plurality of printer control circuits, means controlled by said marker for selecting an idle one of said circuits, switching means controlled by said marker for connecting said control circuit with said sender, registering means in said control circuit and means responsive to the connection of said control circuit with said sender for transferring the registrations from the registering means of said sender to the registering means of said control circuit.

2. In an automatic ticketing system, a calling line, a plurality of trunks each having a ticket printer associated therewith, switching apparatus, a plurality of senders, means for associating an idle one of said senders with said calling line upon the initiation of a call on said line, means in said sender for registering the office code and numerical digits of a wanted line number, a plurality of markers, means for associating an idle marker with a seized sender, means controlled by said marker in accordance with the registered office code digits for controlling said switching apparatus for extending a connection from said line to an idle one of said trunks, a plurality of printer control circuits, means controlled by said marker for selecting an idle one of said circuits, switching means controlled by said marker for connecting said control circuit with said sender and with said selected trunk, registering means in said control circuit, means responsive to the connection of said control circuit with said sender for transferring the registrations from the registering means of said sender to the registering means of said control circuit, and means responsive to the connection of said control circuit with said trunk for controlling the ticket printer of said trunk in accordance with the setting of the registering means of said circuit.

3. In an automatic ticketing system, a calling line, a plurality of trunks each having a ticket printer associated therewith, switching apparatus, a plurality of senders, means for associating an idle one of said senders with said calling line upon the initiation of a call on said line, means in said sender for registering the office code and numerical digits of a wanted line number, a plurality of markers, means for associating an idle marker with a seized sender, means controlled by said marker in accordance with the registered office code digits for controlling said switching apparatus for extending a connection from said line to an idle one of said trunks, a plurality of printer control circuits, means controlled by said marker for selecting an idle one of said circuits, switching means controlled by said marker for connecting said control circuit with said selected trunk, a plurality of identifiers, means responsive to the connection of said control circuit with said trunk for associating an idle one of said identifiers with said control circuit, means in said identifier for registering the digits of the calling line number, registration means in said control circuit and means responsive to the association of said identifier with said control circuit for transferring the registration from the registering means of said identifier to the registering means of said control circuit.

4. In an automatic ticketing system, a calling line, a plurality of trunks each having a ticket printer associated therewith, switching apparatus, a plurality of senders, means for associating an idle one of said senders with said calling line upon the initiation of a call on said line, means in said sender for registering the office code and numerical digits of a wanted line number, a plurality of markers, means for associating an idle marker with a seized sender, means controlled by said marker in accordance with the registered office code digits for controlling said switching apparatus for extending a connection from said line to an idle one of said trunks, a plurality of printer control circuits, means controlled by said marker for selecting an idle one of said circuits, switching means controlled by said marker for connecting said control circuit with said selected trunk, a plurality of identifiers, means responsive to the connection of said control circuit with said trunk for associating an idle one of said identifiers with said control circuit, means in said identifier for registering the digits of the calling line number, registration means in said control circuit, means responsive to the association of said identifier with said control circuit for transferring the registration from the registering means of said identifier to the registering means of said control circuit, and means responsive to the connection of said control circuit with said trunk for controlling the ticket printer of said trunk in accordance with the setting of the registering means of said circuit.

5. In an automatic ticketing system, a calling line, a plurality of trunks each having a ticket printer associated therewith, switching apparatus, a plurality of senders, means for associating an idle one of said senders with said calling line upon the initiation of a call on said line, means in said sender for registering the office code and numerical digits of a wanted line number, a plurality of markers, means for associating an idle marker with a seized sender, means controlled by the marker in accordance with the registered office code digits for controlling said switching apparatus for extending a connection from said line to an idle one of said trunks, a plurality of printer control circuits, means controlled by said marker for selecting an idle one of said circuits, switching means controlled by said marker for connecting said control circuit with said sender and with said selected trunk, registering means in said control circuit, means responsive to the connection of said control circuit with said sender for transferring the registrations from the registering means of said sender to the registering means of said control circuit, a plurality of identifiers, means responsive to the connection of said control circuit with said trunk for associating an idle one of said identifiers with said control circuit, means in said identifier for registering the digits of the calling line number and means responsive to the association of said identifier with said control circuit for transferring the registration from the registering means of said identifier to the registering means of said control circuit.

6. In an automatic ticketing system, a calling line, a plurality of trunks each having a ticket printer associated therewith, switching apparatus, a plurality of senders, means for associating an idle one of said senders with said calling line upon the initiation of a call on said line, means in said sender for registering the office code and numerical digits of a wanted line number, a plurality of markers, means for associating an idle marker with a seized sender, means controlled by the marker in accordance with the registered office code digits for controlling said switching apparatus for extending a connection from said line to an idle one of said trunks, a plurality of printer control circuits, means controlled by said marker for selecting an idle one of said circuits, switching means controlled by said marker for connecting said control circuit with said sender and with said selected trunk, registering means in said control circuit, means responsive to the connection of said control circuit with said sender for transferring the registrations from the registering means of said sender to the registering means of said control circuit, a plurality of identifiers, means responsive to the connection of said control circuit with said trunk for associating an idle one of said identifiers with said control circuit, means in said identifier for registering the digits of the calling line number, means responsive to the association of said identifier with said control circuit for transferring the registration from the registering means of said identifier to the registering means of said control circuit, and means responsive to the connection of said control circuit with said trunk for controlling the ticket printer of said trunk in accordance with the setting of the registering means of said circuit.

7. In an automatic ticketing system, a calling line, a plurality of trunks each having a ticket printer associated therewith, switching apparatus, a plurality of senders, means for associating an idle one of said senders with said calling line upon the initiation of a call on said line, means in said sender for registering the office code and numerical digits of a wanted line number, a plurality of markers, means for associating an idle marker with a seized sender, means controlled by the marker in accordance with the registered office code digits for controlling said switching apparatus for extending a connection from said line to an idle one of said trunks, a plurality of printer control circuits, means controlled by said marker for selecting an idle one of said circuits, switching means controlled by said marker for connecting said control circuit with said sender and with said selected trunk, first registering means in said control circuit, means responsive to the connection of said control circuit with said sender for transferring the registrations from the registering means of said sender to the first registering means of said control circuit, a plurality of identifiers, means responsive to the connection of said control circuit with said trunk for associating an idle one of said identifiers with said control circuit, means in said identifier for registering the digits of the calling line number, second registering means in said control circuit, means responsive to the association of said identifier with said control circuit for transferring the registration from the registering means of said identifier to the second registering means of said control circuit, and means responsive to the connection of said control circuit with said trunk for controlling the ticket printer of said trunk in accordance with the settings of both registering means of said circuit.

JOHN B. RETALLACK.

REFERENCES CITED

The following references are of record in the file of this patent:

UNITED STATES PATENTS

| Number | Name | Date |
|---|---|---|
| 2,297,365 | Ostline | Sept. 29, 1942 |
| 2,352,492 | Ostline | June 27, 1944 |
| 2,373,908 | Ostline | Apr. 17, 1945 |